United States Patent
Elebshihy (10) Patent No.: US 11,524,562 B1
(45) Date of Patent: Dec. 13, 2022

(54) COMPRESSED AIR-POWERED ENGINE

(71) Applicant: Luft Engine Design, LLC, Springfield, NJ (US)

(72) Inventor: Emad Abdelazim Khalil Moustafa Elebshihy, Cairo (EG)

(73) Assignee: Luft Engine Design, LLC, Springfield, NJ (US)

( * ) Notice: Subject to any disclaimer, the term of this patent is extended or adjusted under 35 U.S.C. 154(b) by 0 days.

(21) Appl. No.: 17/748,175

(22) Filed: May 19, 2022

(51) Int. Cl.
| | | |
|---|---|---|
| *B60K 6/00* | (2006.01) | |
| *B60K 6/12* | (2006.01) | |
| *B60K 17/02* | (2006.01) | |
| *B60K 25/02* | (2006.01) | |
| *B60K 17/24* | (2006.01) | |
| *B60K 26/02* | (2006.01) | |
| *B60K 15/03* | (2006.01) | |
| *B60K 3/04* | (2006.01) | |

(52) U.S. Cl.
CPC ............... *B60K 6/12* (2013.01); *B60K 3/04* (2013.01); *B60K 15/03006* (2013.01); *B60K 17/02* (2013.01); *B60K 17/24* (2013.01); *B60K 25/02* (2013.01); *B60K 26/02* (2013.01); *B60K 2015/03026* (2013.01); *B60K 2015/03118* (2013.01); *B60K 2025/022* (2013.01)

(58) Field of Classification Search
CPC ...... B60K 6/12; B60K 2006/123; B60K 3/04; B60K 2015/03118
See application file for complete search history.

(56) References Cited

U.S. PATENT DOCUMENTS

| | | | | |
|---|---|---|---|---|
| 3,765,180 A | * | 10/1973 | Brown | F01B 17/02 60/415 |
| 4,104,955 A | | 8/1978 | Murphy | |
| 4,355,508 A | * | 10/1982 | Blenke | F01B 17/02 60/415 |
| 4,478,304 A | | 10/1984 | Delano | |
| 6,044,924 A | * | 4/2000 | Adli | B60K 3/00 180/242 |
| 6,508,324 B1 | * | 1/2003 | Conley, Jr. | B62M 1/10 180/65.21 |
| 7,315,089 B2 | * | 1/2008 | Lambertson | B60L 50/66 290/1 A |
| 8,240,416 B2 | * | 8/2012 | Cong | F03D 9/17 180/2.2 |
| 2009/0301796 A1 | * | 12/2009 | Wedderburn, Jr. | F03D 9/11 180/2.2 |

(Continued)

*Primary Examiner* — Brian L Swenson
(74) *Attorney, Agent, or Firm* — Lerner, David, Littenberg, Krumholz & Mentlik, LLP (57) ABSTRACT

An engine capable of operating on compressed air includes one or more first pressurized air tanks, one or more second pressurized air tanks, a first motor including a casing, a transmission shaft disposed within the casing, a first motor entry port coupled to the one or more first pressurized air tanks for receiving compressed air, and a first motor exit port for exhausting the received compressed air, a second motor including a turbine housing, a crankshaft, and a turbine for rotating the crankshaft disposed within the turbine housing, a second motor entry port coupled to the one or more second pressurized air tanks for receiving compressed air, and a second motor exit port for exhausting the received compressed air, and an auto clutch for selectively coupling the transmission shaft to the crankshaft.

20 Claims, 4 Drawing Sheets

(56) References Cited

U.S. PATENT DOCUMENTS

| | | | |
|---|---|---|---|
| 2013/0333969 A1* | 12/2013 | Dieckmann | B60T 1/10 180/165 |
| 2014/0130485 A1* | 5/2014 | Huff | B60L 8/003 60/370 |
| 2014/0223896 A1* | 8/2014 | Zhou | F01B 17/02 60/370 |

* cited by examiner

COMPRESSED AIR-POWERED ENGINE

TECHNICAL FIELD OF THE INVENTION

The present application relates to engines powered by compressed air.

BACKGROUND

Conventional engines require fuels, such as fossil fuels or batteries. Fossil fuels negatively impact the environment and refueling engines with more fossil fuels is often inconvenient and expensive. Batteries are considered to be more environmentally friendly than fossil fuels, they still need to be recharged, which often can be even more inconvenient and very difficult, such as in the case of a vehicle driven for a long distance with no recharging facilities, and even more expensive than with fossil fuels. Alternative energy sources for powering engines, such as biodiesel fuel, ethanol, hydrogen fuel cells, and natural gas, are currently being explored, but these fuels also require refueling and are vulnerable to limited supply, thus making them potentially problematic.

One proposed alternative for fuel-based engines is to power the engine using compressed air. However, current air-powered engine designs are plagued by both poor torque and poor energy efficiency. Some torque can be generated by releasing compressed air from a pressurized air tank into a turbine. However, a lot of compressed air must be expended from the tank to generate torque, and most of this compressed air is lost to exhaust in the process. Losing compressed air to exhaust means that the air tank must be repressurized frequently. However, energy must be expended in order to fill and refill the pressurized air tank with compressed air, lowering the energy efficiency of the design and adding both inconvenience and expense to powering the engine.

BRIEF SUMMARY OF THE INVENTION

One aspect of the disclosure is directed to an engine, comprising: one or more first pressurized air tanks; one or more second pressurized air tanks; a first motor including a casing, a transmission shaft disposed within the casing, a first motor entry port coupled to the one or more first pressurized air tanks for receiving compressed air, and a first motor exit port for exhausting the received compressed air; a second motor including a turbine housing, a crankshaft, and a turbine for rotating the crankshaft disposed within the turbine housing, a second motor entry port coupled to the one or more second pressurized air tanks for receiving compressed air, and a second motor exit port for exhausting the received compressed air; and a clutch for selectively coupling the transmission shaft to the crankshaft.

In some examples, the clutch may be configured to couple the transmission shaft to the crankshaft during startup of the engine and in response to a heavy load scenario.

In some examples, each of the one or more first pressurized air tanks may be a cylinder made of either carbon fiber or fiber glass and may be configured to store compressed air at a pressure of at least 1300 bar.

In some examples, the engine may further include a first motor entry valve positioned along a channel between the one or more first pressurized air tanks and the first motor entry port. A rotational speed of the transmission shaft may be configured to increase in response to opening of the first motor entry valve and to decrease in response to closing of the first motor entry valve.

In some examples, the transmission shaft may include: a secondary casing disposed within the primary casing; a plurality of inlets on a surface of the secondary casing and through which the compressed air moves to fill the secondary casing; and a plurality of radially-extendable members positioned on the secondary casing and configured to transition between a folded state and an open state. The plurality of radially-extendable members may be configured to transition from the folded state to the open state in response to the secondary casing being filled with air.

In some examples, the engine may further include a suction pump positioned at the first motor exit port. The transmission shaft may be configured to increase a rotational speed in response to an increase of force applied by the suction pump.

In some examples, the engine may further include an airflow control port positioned on the casing and configured to control a direction of airflow through the casing. The direction of airflow through the casing may control a rotational direction of the transmission shaft.

In some examples, each of the one or more second pressurized air tanks may be a cylinder made of either carbon fiber or fiber glass and configured to store compressed air at a pressure of at least 1300 bar.

In some examples, the engine may further include a second motor entry valve positioned along a channel between the one or more second pressurized air tanks and the second motor entry port. The second motor entry valve may be configured to open the channel in response to a manual input.

In some examples, the second motor entry valve may be a shaft, and the shaft may be configured to slide in a direction that opens the channel between the one or more second pressurized air tanks and the second motor entry port in response to the manual input.

In some examples, the engine may further include, the manual input may be depression of an accelerator pedal in a vehicle.

In some examples, the turbine of the second motor may include at least three and up to ten blades radially extending from the crankshaft.

In some examples, the engine may further include: an external turbine connected to the second motor exit port to receive exhaust air at a pressure level higher than ambient pressure; an alternator coupled to the external turbine and configured to convert mechanical energy of the external turbine into electrical energy; and a compressor powered at least in part by electrical energy generated from the alternator and configured to replenish pressurized air to at least one of the one or more second pressurized air tanks.

In some examples, the compressor may be configured to replenish pressurized air to at least one of the one or more second pressurized air tanks by up to 100 bar.

In some examples, the alternator may be further configured to supply electrical energy to at least one of a vehicle battery or a vehicle auxiliary device.

Another aspect of the disclosure is directed to a vehicle including an engine as described in any of the embodiments herein.

The vehicle may further include a case installed on a chassis of the vehicle. The one or more second pressurized air tanks may include three pressurized air tanks positioned in the case and configured to provide the compressed air to the motor in parallel.

In some examples, the one or more second pressurized air tanks may include a fourth pressurized air tank configured to store compressed air and connected to the three pressurized air tanks in the case.

In some examples, the vehicle may further include: a first foot pedal configured to open the first motor entry port; and a second foot pedal configured to open the second motor entry port.

In some examples, the first motor may be configured to drive the transmission shaft at 40,000 revolutions per minute (rpm), and the second motor may be configured to drive the turbine at 70,000 rpm.

These and further aspects of the disclosure are described in greater detail in reference to the following drawings.

DETAILED DESCRIPTION

Overview

The present disclosure is a selectively couplable dual-motor design that provides a compressed air-powered engine with improved torque capabilities and higher energy efficiency. The engine includes two independently operated motors: a first motor for generating torque, and a second motor for generating speed. Each motor is powered independently by one or more separate pressurized air tanks.

The first motor, also referred to herein as a "torque motor," includes a rotatable transmission shaft that provides the starting power for the engine and is capable of delivering additional torque in heavy load situations. The transmission shaft is housed within a casing having an entry port for receiving compressed air from the corresponding pressurized air tank, and includes blades, such as fins, that move and cause the transmission shaft to rotate in response to an increase in pressure at the entry port. The interior of the casing is also equipped with channels to allow the air to escape, thus ensuring continuous rotation by repeatedly pumping compressed air into the entry port from the pressurized air tank.

The second motor, also referred to herein as a "speed motor," includes one or more turbines that control the speed of the engine. Compressed air from the corresponding pressurized air tank is channeled into a housing of the turbine and causes the blades of the turbine to rotate, which in turn increases the speed of the engine. An amount of compressed air that is channeled into the turbine housing may be controlled by a valve, whereby opening and closing of the valve may be controlled by a manual switch, lever or other control, such as an accelerator pedal in the case of a vehicle. The turbine may include its own crankshaft that may be selectively coupled to or decoupled from the transmission shaft of the torque engine depending on the torque required by a load of the engine. For instance, during startup of the engine, or in a heavy load situation, the crankshaft may be coupled to the transmission shaft by an auto clutch mechanism. In this manner, each of a speed and a torque of the second motor can be independently controlled via the valve and the auto clutch, respectively.

Exhaust air from the second motor is released from the turbine housing at a higher pressure than ambient pressure and may be reused to replenish the pressurized air tank of the second motor, and optionally the first motor as well. For example, an air outlet of the second motor may be connected to an external turbine, and the exhaust air may be channeled towards and used to drive the external turbine. Mechanical energy generated by the external turbine may be converted to electrical energy by an alternator, and the electrical energy may be used to power a compressor. The compressor may be used to replenish the pressurized air in the pressurized air tank of the second motor. An energy efficiency of the second motor, and by extension the engine as a whole, may be significantly increased by reuse of the exhaust air to replenish the pressurized air tank, meaning that engine can perform significantly more work without having to stop to refill the pressurized air.

The compressed air-powered engine design of the present disclosure provides for both improved torque and improved energy efficiency over prior designs of compressed air-powered engines. An engine designed according to the specifications of the present disclosure may be capable of generating sufficient electricity to power homes or other loads that are disconnected from the energy grid, and sufficient motive power to power a vehicle. Furthermore, the engine requires no batteries, fossil-based fuels or other types of fuels, as only pressurized air is required to drive the motors. Furthermore, the alternator connected to the exhaust of the vehicle may even be used to recharge the vehicle battery, power the auxiliary devices of the vehicle such as lighting and alarms, or both. This provides an environmentally friendly solution for engine design that is less vulnerable to fuel supply shortages and requires less replenishing than conventional pressurized air tanks.

Example Systems

Figure 1:
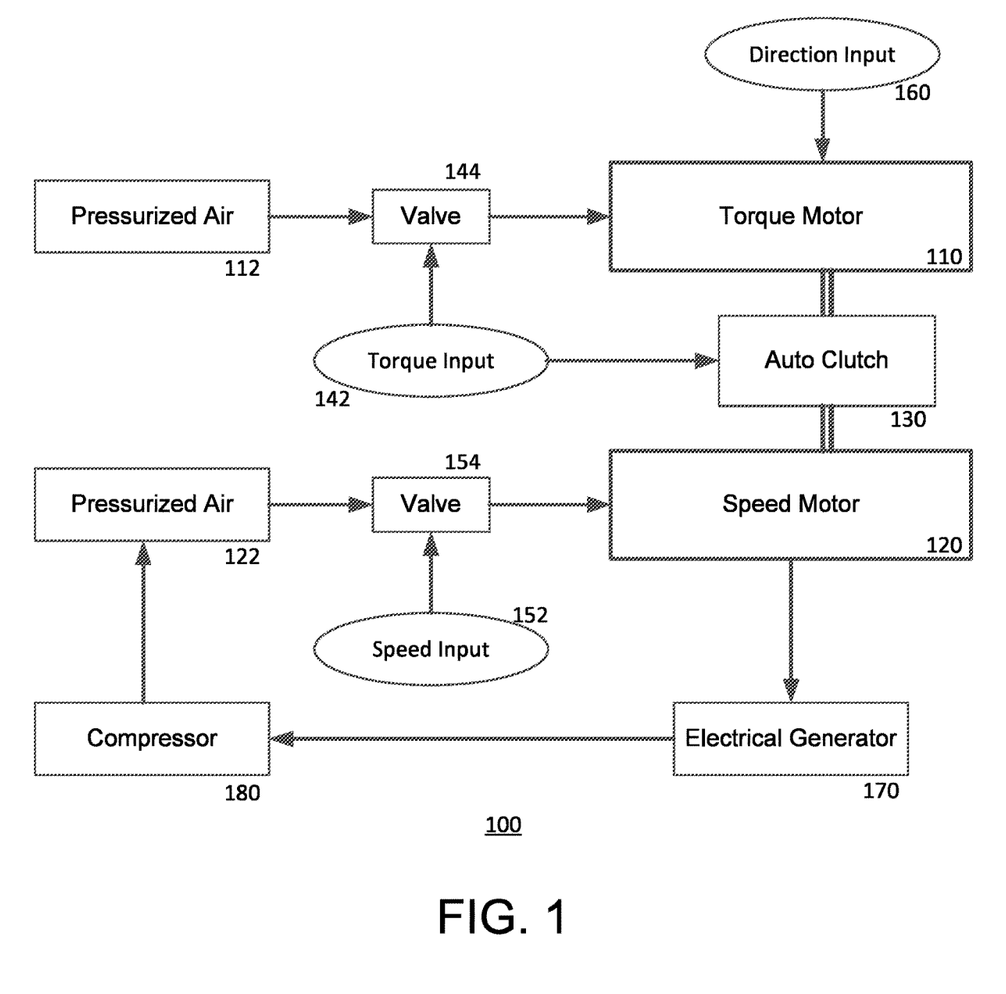
FIG. 1 is a functional block diagram of an example system in accordance with an aspect of the disclosure.

FIG. 1 is a functional diagram illustrating an example engine system 100 powered by compressed air. The system 100 includes two motors: a first motor 110 referred to herein as a "torque motor" for generating torque, and a second motor 120 referred to herein as a "speed motor" for generating speed. Each of the torque motor 110 and the speed motor 120 is powered by compressed air, which may be supplied from respective first and second tanks 112, 122 containing pressurized air. The torque motor 110 and the speed motor 120 may be selectively connected to one another using a clutch 130. In the example of FIG. 1, the clutch 130 is shown as an automatic clutch, although in other examples the clutch may be manually controlled. When the clutch 130 is set to disengage the motors 110, 120 from one another, the torque motor 110 may rotate according to an amount of pressurized air supplied from its respective tank 112, and the speed motor may rotate according to an amount of pressurized air supplied from its respective tank 122. When the clutch 130 is to engage the motors 110, 120 with one another, then the torque motor 110 may supply additional torque from the torque motor 110 to the speed motor 120.

The system 100 may include inputs or controls for controlling operations of each of the torque motor 110, the speed motor 120 and the clutch 130. One control may be a torque input 142 provided to control an amount of torque generated at the torque motor 110. In operation, the torque input 142 may control a valve 144 positioned in a channel between the first pressurized air tank 112 and the torque motor 110, whereby opening the valve 144 may increase an amount of compressed air supplied to the torque motor 110, and increasing an amount of compressed air supplied to the torque motor 110 may increase an amount of torque at the torque motor 110. Another control may be a speed input 152 provided to control an amount of speed generated at the speed motor 120. In operation, the speed input 152 may control a valve 154 positioned in a channel between the second pressurized air tank 114 and the torque motor 110, whereby opening the valve 154 may increase an amount of compressed air supplied to the speed motor 120, and increasing an amount of compressed air supplied to the speed motor 120 may increase an amount of speed generated by the speed motor 120. Yet a further control may be a direction input 160 provided to control a direction of rotation of the torque motor 110. In other words, in the example of an engine provided in a vehicle, the direction input may be a manually controlled throw or switch accessible to a driver and used to control whether the engine drives the vehicle forward or backward.

In the example of FIG. 1, the torque input 142 is also used to control operation of the clutch 130. For instance, an input from the torque input 142 to open the corresponding valve 144 may indicate that the engine requires additional torque, meaning that torque must be supplied from the torque motor 110 to the speed motor 120. Thus, the torque input 142 to open the corresponding valve 144 may also be used to signal that the clutch 130 should connect the torque motor 110 to the speed motor.

Also in the example of FIG. 1, the speed motor 120 is connected to an electrical generator 170. The connection may be through an outlet of the speed motor 120 for exhausting the compressed air, whereby the exhausted compressed air may be channeled through the outlet to the downstream generator 170. Since the exhausted compressed air is still at a pressure above atmospheric pressure, it may still be used to generate power at the electrical generator 170. Electricity generated at the electrical generator may then be used to power other components of the system 180, such as a compressor 180 for compressing ambient air. The compressed air output from the compressor may in turn be channeled into the second pressurized air tank 122 associated with the speed motor 120. The reuse of exhausted air from the speed motor 120 to replenish the pressurized air supply of the motor can increase an overall efficiency of the motor, thereby making the need to manually replenish or refill the second pressurized air tank 122 less frequent.

Figure 2:
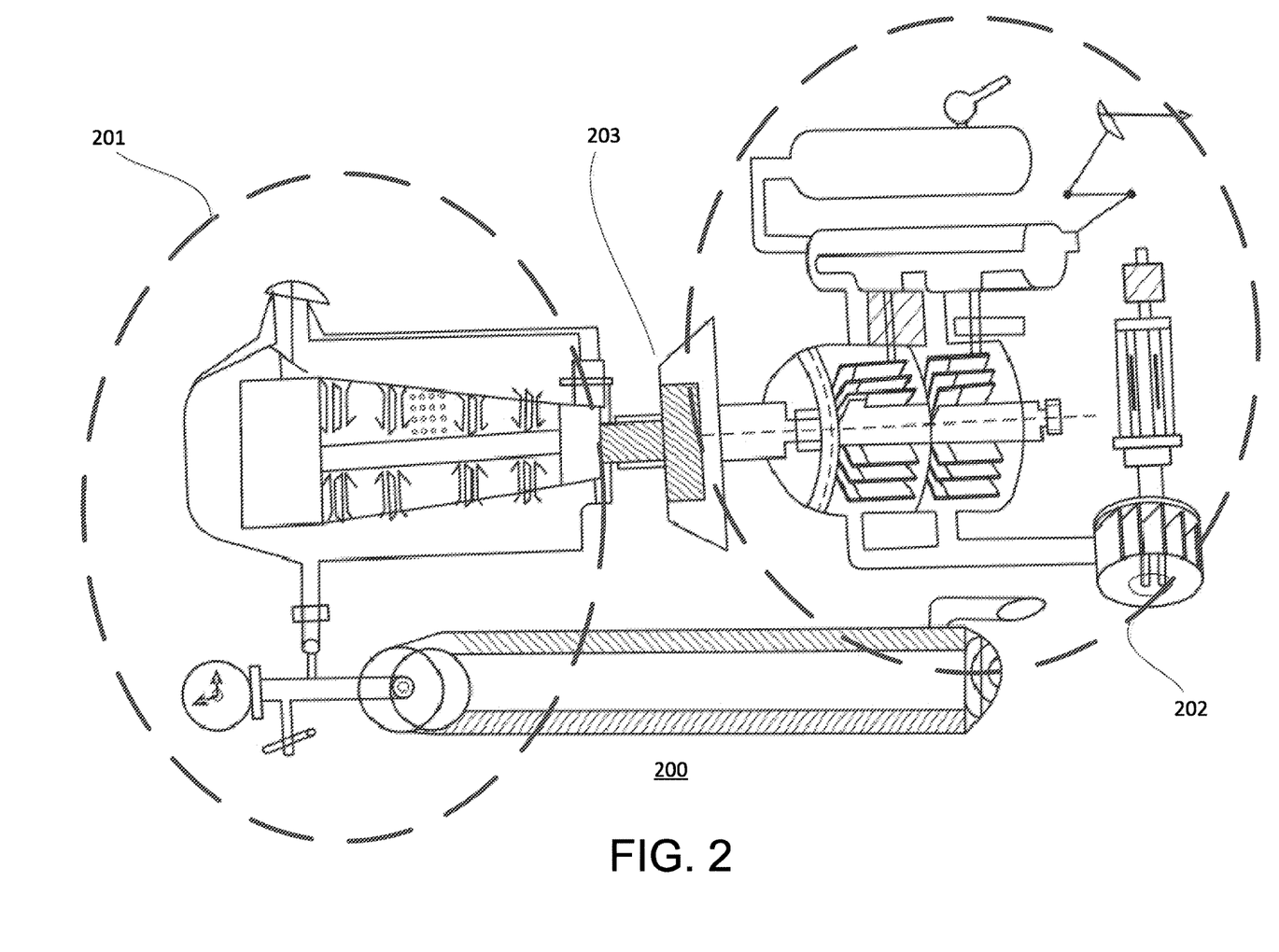
FIG. 2 is an illustration of an example implementation of the system of FIG. 1.

An example structure and operation of the system 100 of FIG. 1 is described is connection with FIG. 2, which is an illustration of an example vehicle engine 200. As with the system 100 of FIG. 1, the engine 200 shown in FIG. 2 includes each of a torque motor 201 and a speed motor 220 connected by an automatic clutch 203.

Figure 3:
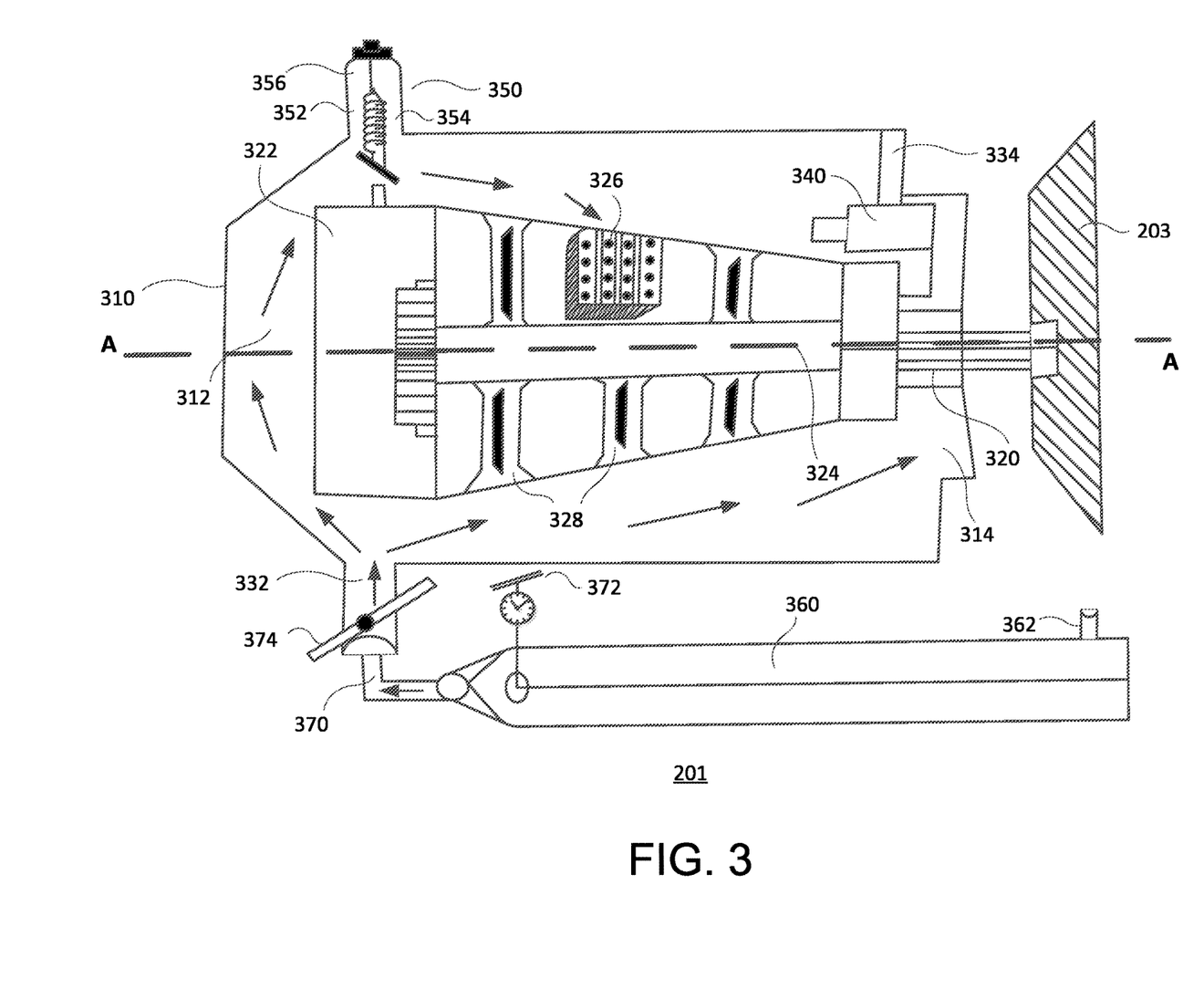
FIG. 3 is a zoomed view of a torque motor portion of the illustration of FIG. 2.

FIG. 3 is a zoomed view of the torque motor portion 201 of the engine 200 of FIG. 2. The torque motor 201 includes a primary casing 310, a transmission shaft 320 disposed within the primary casing 310. The primary casing 310 may include a first end 312 and a second end 314 opposite the first end 312. The first end 312 may be free, while the second end 314 may be attached to the automatic clutch 203. The transmission shaft 320 extends within the primary casing 310 along a primary axis A-A and is configured to rotate about the primary axis A-A. The transmission shaft 320 may have a rotational symmetry about the primary axis A-A and may be attached to the automatic clutch 203 at the second end 314 of the primary casing 310. In operation, rotation of the transmission shaft 320 may generate torque, and this torque may be transferred to the speed motor 302 through the automatic clutch 203.

Multiple ports may be formed in the primary casing 310 to permit compressed air to enter and exit the torque motor 201. The multiple ports may include at least a torque motor entry port 332 through which the compressed air enters the primary casing 310 and a torque motor exit port 334 through which the compressed air that enters the primary casing 310 can be exhausted. In the example of FIG. 3, the torque motor entry port 332 is positioned at the first end 312 of the primary casing 310 and the torque motor exit port 334 is positioned at the second end 314 of the primary casing 310, although in other example arrangements the positioning of the entry and exits ports may be different, such as reversed.

In the example of FIG. 3, the transmission shaft 320 includes a secondary casing 322 including one or more channels 324 for air to flow inside the transmission shaft 320. Air inlets 326 formed in the secondary casing 322 permit for compressed air to flow from the interior of the primary casing 310 to the interior of the secondary casing 322. The channels 324 may connect to the torque motor exit port 334 to allow the compressed air to be exhausted from the torque motor 201.

The transmission shaft 320 further includes a plurality of radially-extendable members 328 that, when extended radially from a body of the transmission shaft, create a drag force against the flow of compressed air within the primary casing 310. Because the ports are positioned to support flow of the compressed air between the first side 312 and the second side 314 of the primary casing 310, the drag force causes the transmission shaft 320 to rotate.

The radially-extendable members 328 may be capable of transitioning between a first position in which they are recessed within recesses of the transmission shaft 320 and a second position in which they extend radially outward from the recesses. The first position may be a folded state of the radially-extendable members 328 in which they are folded into a surface of the transmission shaft 320, and the second position may be an open state of the radially-extendable members 328 in which they are unfolded from the surface of the transmission shaft 320. In operation, the radially-extendable members 328 may transition from the first position to the second position when a pressure difference between the inside of the primary casing 310 and the inside of the secondary casing 322 exceeds a threshold amount, at which point the higher pressure of the secondary casing interior pushes the radially-extendable members 328 outward from their respective recesses. Thus, when the compressed air initially enters the interior of the secondary casing 322, the pressure difference causes the radially-extendable members 328 to transition from the first position to the second position. Later, when the compressed air inside the secondary casing is exhausted through torque motor exit port 334, the pressure difference between the interior of the primary casing 310 and the interior of the second casing 322 may drop to a level that causes the radially-extendable members 328 to transition from the second position back to the first position.

When the radially-extendable members 328 transition from the first position to the second position, this decreases the volume in the interior of the primary casing 310 while simultaneously increasing the volume in the interior of the secondary casing 322. The relative change in volumes increases the pressure difference between the primary casing 310 and the secondary casing 322.

In some examples of the disclosure, the radially-extendable members 328 of the transmission shaft may be fins. In other examples, the radially-extendable members 328 may be blades or any other longitudinal element capable of creating a drag force for rotating the transmission shaft 320.

The torque motor 201 may further include a pump 340 to control a continuous flow of compressed air between the torque motor entry port 332 and the torque motor exit port 334. In the example of FIG. 3, the pump 340 is a suction pump positioned at an opening of the torque motor exit port 334 and configured to increase a suction force at the torque motor exit port 334 in order to pull compressed air through the channels 324 of the secondary casing 322. The suction pump 340 may be an electrical component controlled by electrical signals. In operation, the suction pump 340 may control a rotational speed of the transmission shaft 320, whereby the greater the level of suction force at the pump, the greater the pressure difference between the interior of the primary casing 310 and the interior of the secondary casing 322, the faster the compressed air flows through the torque motor 301, and the faster the transmission shaft 320 rotates.

In some examples in which it is desired to a control a direction of rotation of the transmission shaft 320, the multiple ports may further include an airflow control port 350 for controlling a direction of airflow within the primary casing 310 between the torque motor entry port 332 and the torque motor exit port 334. The airflow control port 350 may include a first airflow control channel 352, a second airflow control channel 354, and a switch 356 for selectively opening one of the first or second airflow control channels 352, 354. The switch 356 may be controlled by a manual control, such as a forward/reverse control in the case of a vehicle. Each of the first and second airflow control channels 352, 354 may be positioned to promote airflow within the interior of the primary casing 310 in a different rotational direction around the primary axis A-A. For example, opening the first airflow control channel 352 may cause compressed air to flow through the interior of the primary casing in a clockwise direction around the primary axis A-A, while opening the second airflow control channel 354 may cause compressed air to flow through the interior of the primary casing in a counterclockwise direction around the primary axis A-A. The change in airflow direction can impact both the direction of initial rotation of the transmission shaft 320 due to the relative changes in volumes of the interior of the primary casing 310 and the interior of the secondary casing 322, as well as the continued rotation of the transmission shaft due to compressed air flowing against the radially-extendable members 328.

In order to supply compressed air to the torque motor 201, the torque motor entry port 332 may be connected to a first pressurized air tank 360 through a torque motor inflow channel 370.

The first pressurized air tank 360 may be a substantially cylindrical tank capable of holding pressurized air at a pressure of at least 1300 bar. The tank 360 may be made of carbon fiber or fiber glass, and may include each of a thermal wall to avoid freezing when the tank is at high pressure, and a capillary wall to ensure quality of the stored air at high pressures. The capillary wall may include a cotton and wool fill to provide insulation. The tank 360 may further include a refill port 362 for manually refilling the tank 360 with pressurized air.

A first end of the torque motor inflow channel 370 on a side of the tank 360 may be connected to a choke valve and a pressure regulator 372 for controlling pressure contribution of the tank 360 to the torque motor. Additionally, a second end of the torque motor inflow channel 370 on a side of the torque motor entry port 332 may be connected to an inflow valve 374 for controlling the entry of compressed air into the primary casing 310 of the torque motor 201. A safety valve (not shown) may also be included in the inflow channel 370.

In operation, the interior of the primary casing 310 may be in a vacuum state. Then, when the inflow valve 374 opens, compressed air from the tank 360 flows into the primary casing 310 and continues to enter until the primary casing 310 is filled with compressed air, at which time the pressure difference between the primary casing and the secondary casing causes the air to rush into the secondary casing through the openings 326. This will cause the radially-extendable members 328 to be pushed out of their respective recesses and the initial rotation of the transmission shaft. The suction pump 340 causes the continuous rotation of the transmission shaft 320 caused by compressed air pushing on the radially-extendable members 328 like a windmill or turbine. The rotational speed of the transmission shaft 320 may be a function of the suction force at the suction pump 340, whereby the greater the suction force at the suction pump 340, the faster the transmission shaft 320 will rotate. The flow of compressed air through the primary casing 310 may be maintained by exhausting the compressed air through the torque motor exit port 334.

Figure 4:
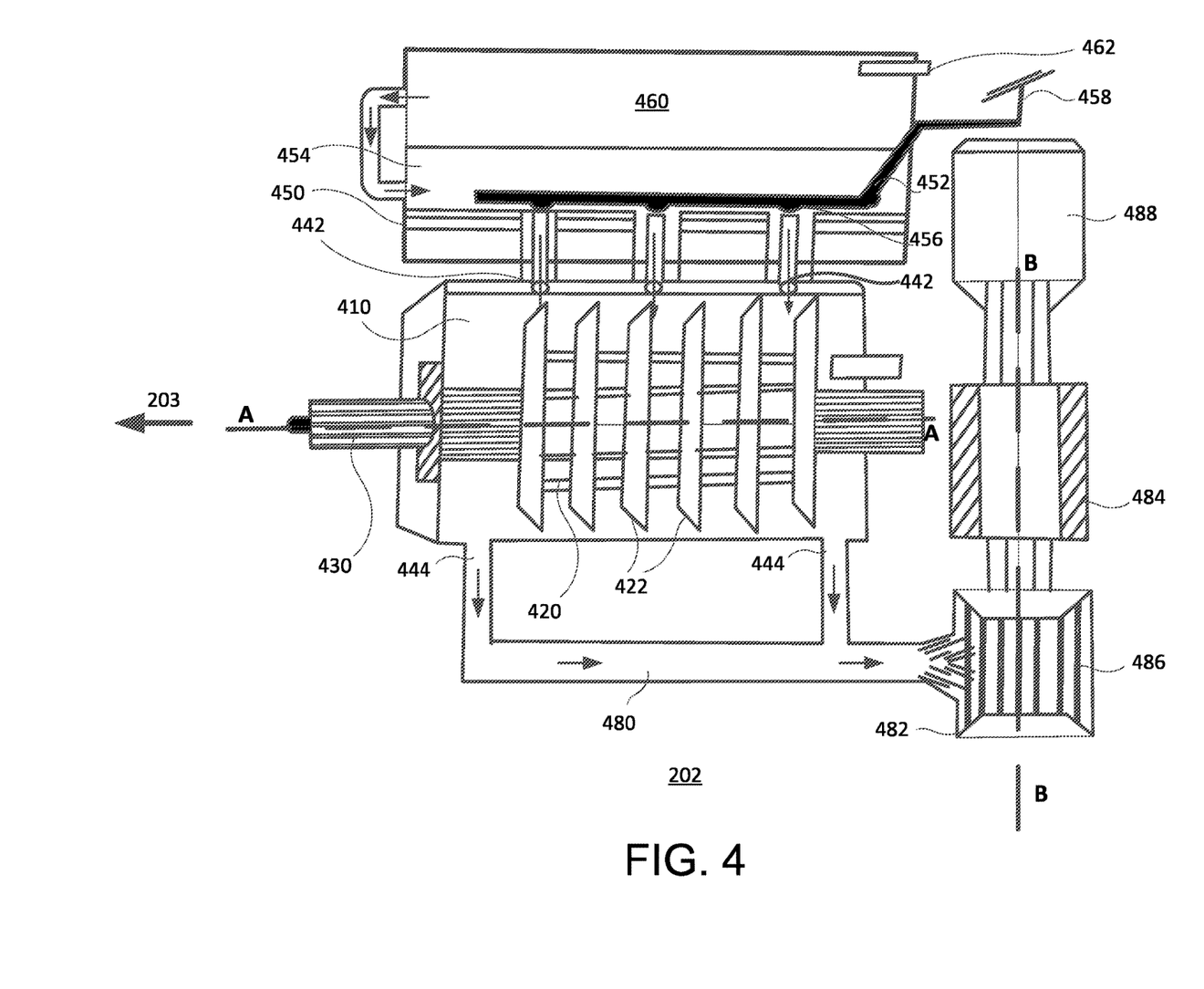
FIG. 4 is a zoomed view of a speed motor portion of the illustration of FIG. 2.

FIG. 4 is a zoomed view of the speed motor portion 202 of the engine 200 of FIG. 2. The speed motor 201 includes a turbine housing 410, a turbine 420 disposed within the turbine housing 410, and a crankshaft 430 coupled to the turbine 420. The crankshaft 430 extends within the turbine housing 410 along the primary axis A-A, which may be the same as the primary axis shown in FIG. 3. The turbine 420 may be configured to rotate about the primary axis A-A. The crankshaft 430 may be attached to the turbine 420 such that when the turbine 420 rotates, the crankshaft 430 may rotate with the turbine 420. The crankshaft 430 may be coupled to the automatic clutch 203. The transmission shaft of the torque motor 201 may be selectively coupled to the crankshaft 430 of the speed motor 202 through the automatic clutch 203 in order to supply additional torque from the torque motor 201 to the speed motor 202.

Multiple ports may be formed in the turbine housing 410. The multiple ports may include at least one speed motor entry port 442 through which compressed air enters the turbine housing 410 and at least one speed motor exit port 444 through which the compressed air that enters the turbine housing 410 can be exhausted. In the example of FIG. 4, three speed motor entry ports 442 are positioned on a different side of the turbine housing 410 from two speed motor exit ports 444, such that the compressed air flows circumferentially around the turbine 420 as the compressed air moves from the three speed motor entry ports 442 to the two speed motor exit ports 444. In effect, the relative positioning of the speed motor entry ports 442 and speed motor exit ports 444 is selected so that the compressed air causes the turbine 420 to rotate. The positioning of the speed motor entry ports 442, speed motor exit ports 444 and turbine 420 may be configured so that the turbine is capable of rotating in either direction. The direction of rotation of the turbine 420 is initially controlled by coupling of the crankshaft 430 to the transmission shaft of the torque motor 201 through the clutch 203, whereby once the turbine 420 is rotating in the desired direction, the speed of rotation may then be increased according to the flow of compressed air through the speed motor entry and exit ports 442, 444.

The turbine 420 may be a fan including a plurality of blades 422 radially extending from the primary axis A-A. The blades 422 may be made from a hard and durable material such as nickel chromium or a thermally treated steel with a high carbon content. The blade material may also be chosen to safeguard against rusting. Additionally, the blades 422 may be set at a predefined angle or inclination so as to maximize an energy transfer between the moving compressed air and the rotating turbine 420. The number of blades may be predetermined based on a relative size of the engine that the speed motor is expected to power. In the case of a vehicle engine, between three to ten blades may typically be used for the speed motor turbine 420.

In operation, a rotational speed of the turbine 420 may be controlled based on an amount of compressed air introduced to the interior of the turbine housing through the speed motor entry ports 442. This amount of compressed air may be controlled by a speed motor inflow valve 450. In the example of FIG. 4, the speed motor inflow valve 450 includes a shaft 452 positioned within a longitudinal cavity 454 connected to the turbine housing 410 by the speed motor entry ports 442, whereby each of the speed motor entry ports 442 is positioned at a different point along a length of the longitudinal cavity 454. The shaft may include respective gates 456 positioned to cover each of speed motor entry ports 442 within the longitudinal cavity 454 when the shaft 452 is in a first position, and to uncover the speed motor entry ports 442 when the shaft 452 is in a second position. Movement of the shaft 452 between the first and second positions may be controlled by manual input, such as an accelerator pedal 458 in the case of a vehicle. In operation, pressing down on the accelerator pedal 458 may cause the shaft 452 to slide forward or backward along a length of the longitudinal cavity 454 from the first position to the second position, thereby opening the speed motor entry ports 442 and permitting compressed air to flow into the turbine housing 410.

In order to supply compressed air to the speed motor 202, the speed motor inflow valve 450 may be connected to a second pressurized air tank 460 through an inflow channel 470. The second pressurized air tank 460 may have properties that are the same as or similar to the first pressurized air tank 360 described in connection with FIG. 3. As shown in FIG. 4, the second pressurized air tank 460 also includes a refill port 462 for refilling the tank 460 with pressurized air. The refill port 462 may be used for initial pressurization of the tank 460, as well for both manual and automatic re-pressurization operations at a later time. Alternatively, the refill port 462 may be used for manual filling, whereas automatic refilling may be done through a separate port (not shown) of the tank 460.

The turbine 420 rotates when air flows from the speed motor entry ports 442 to the speed motor exit ports 444, which occurs when there is a pressure difference between the speed motor entry ports 442 and the speed motor exit ports 444. In this regard, the greater the pressure difference between the speed motor entry ports 442 and the speed motor exit ports 444 the faster the air flow and the faster the turbine 420 will rotate. Although the pressure of the exhausted air at the speed motor exit ports 444 is less than the pressure at the speed motor entry ports 442, the exhaust pressure is still higher than atmospheric. As such, there is still energy in the exhausted air that can be recaptured downstream of the turbine housing 410. A speed motor outflow channel 480 may connect the speed motor exit ports 444 to a secondary turbine 482. The secondary turbine 482 may include blades 486 that extend radially from and rotate about a secondary axis B-B. The exhausted air drives the blades 486 of the secondary turbine 482 to generate power at a power generator 484 such as a dynamo or an alternator. Electrical power generated by the power generator 484 can be provided to various electrical applications of the engine or associated machinery, such as charging a battery or powering auxiliary devices (such as lighting or an alarm) in the case of a vehicle. The electrical power can also be provided to a compressor 488, which can be used to convert ambient air into pressurized air and supply the pressurized air to the second pressurized air tank 460, either through the refill port 462 or through a separate port. Refilling the second pressurized air tank 460 can compensate for some of the air pressure lost during driving the turbine 420 of the speed motor 202. In one example, the compressor 488 may be capable of replenishing enough air to the tank 460 to increase the tank pressure by 100 bar. The compressor 488 may be programmed or otherwise configured to refill the tank 460 when pressure at the tank drops below a threshold amount. In one example embodiment, the tank 460 may be refilled to a pressure level 300 bar after it drops to a pressure level of 200 bar.

Returning to FIG. 2, in operation, the engine 200 may be powered by a combination of the torque motor and the speed motor. In the case of a vehicle, the vehicle may include manual controls for controlling startup of the engine 200. For instance, a transmission control may activate the torque motor 201, such as by causing the torque motor 201 to begin to rotate when the vehicle is moved from park or neutral into drive. This may be facilitated by opening the torque motor entry valve between a pressurized air source and the motor, optionally, activating a suction pump at the torque motor exit valve. Additionally, an accelerator pedal may be used to activate the speed motor 202 by opening a gate between a pressurized air source and the motor. In an alternative arrangement, the accelerator pedal may be connected to both the torque motor 201 and the speed motor 202, whereby depressing the pedal may activate both motors. In yet a further example, a second foot pedal may be provided, and the separate foot pedal may be interlocked with the torque motor 201 as an additional safety mechanism to ensure safety during startup of the engine 200.

During startup of the engine 200, the automatic clutch 203 may connect the torque motor 201 and speed motor 202 so that torque from the torque motor 201 is initially supplied to the vehicle to propel it forward (or backward depending on the direction control at the torque motor). After startup, the automatic clutch 203 may disengage the speed motor 202 from the torque motor 201, such as if the speed motor is sufficient to the drive the vehicle. However, in heavy situations requiring increased torque, the automatic clutch 203 may re-engage the speed motor 202 with the torque motor 201. Operation of the automatic clutch 203 to connect and disconnect the engine components may be performed according to techniques that are well known in the art.

For the sake of simplicity, the above examples describe a torque motor and a speed motor each equipped with a single turbine driven by a respective single pressurized air tank. However, it should be understood that either or both of the torque motor and the speed motor may be equipped with multiple turbines using the same or similar principles as described herein. For instance, multiple turbine casings may be provided in parallel or in series with one another without departing from the underlying principles of the present disclosure. Additionally, a single turbine casing of the torque motor or turbine housing of the speed motor may contain multiple turbines therein. In the case of a vehicle, a range of two to five turbines has been found to be advantageous for driving the speed motor of the vehicle.

Additionally or alternatively, either or both of the torque motor and the speed motor may be supplied with compressed air by multiple pressurized air tanks. Each tank of a given motor may be connected to the motor through a common inflow channel, or each tank may be connected to the given motor through its own respective inflow channel. The tanks may be maintained at a common pressure level, such as at 1300 bar when full. Providing additional tanks may improve an efficiency of the design, since pressure provided to the motor from the tanks remains steady and drops at a slower rate. For example, if a speed motor operated on one pressurized air tank were capable of travelling 160 miles, then a speed motor operated on two pressurized air tanks would be capable of travelling about 320 miles.

In some instances, at least some tanks may be connected in series, such as a single tank serving as a storage tank upstream of a plurality of other tanks feeding into the motor. For instance, the speed motor may be connected to three separate pressurized air tanks, and each of the three tanks may be connected to an upstream fourth pressurized air tank for replenishing air pressure at the three tanks. In the case of a vehicle equipped with multiple pressurized air tanks, the tanks may be installed on a chassis of the vehicle. A cylinder casing may be included to hold the plurality of pressurized air tanks. For instance, the cylinder casing may have a capacity for holding four or five tanks.

In the case of a vehicle equipped with an example compressed air-powered engine of the present disclosure, the vehicle may include additional components that are well known and understood in the relevant field of technology. For instance, the vehicle may include a braking system for slowing down or stopping the vehicle. The braking system may operate by not only applying a frictional force to wheels of the vehicle, but also by cutting off the supply of compressed air to the engine, such as by closing one or more valves along the inflow channels of the torque motor, speed motor or both.

The example compressed air-powered engines of the present disclosure greatly improve the energy efficiency over prior known configurations while at the same time reducing the overall number of mechanical parts. Because of the high pressure (e.g., 1300 bar) supplied by the pressurized air tanks, the torque motor may be capable of generating rotation of the transmission shaft at rotational speeds of up to 40,000 revolutions per minute (RPM) or even 50,000 RPM, and the speed motor may be capable of driving the crankshaft at rotational speeds of up to 70,000 RPM or even 80,000 RPM. The engine creates a highly reliable source of rotary power from a readily available and easily replenishable resource, while also not being dependent on fossil fuels or other fuel sources. Thus, the engine design is environmentally friendly while also not creating undue costs and burdens for replenishing power sources.

The above examples generally describe an engine suitable for use in a vehicle. However, those skilled in the art will readily appreciate that the underlying principles of the present disclosure are similarly applicable to other engines, such as an engine included in a power generator. Additionally, while the examples of the present disclosure generally describe an engine that is capable of operating a vehicle or other device entirely on its own, it should be recognized that the underlying principles of the present disclosure are similarly applicable to engines included in hybrid-powered devices, such as a hybrid vehicle that contains a reserve fuel source, such as a diesel fuel or a battery, for situations when the pressurized air tank cannot be refilled.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An engine, comprising:
   one or more first pressurized air tanks;
   one or more second pressurized air tanks;
   a first motor including a casing, a transmission shaft disposed within the casing, a first motor entry port coupled to the one or more first pressurized air tanks for receiving compressed air, and a first motor exit port for exhausting the received compressed air;
   a second motor including a turbine housing, a crankshaft, and a turbine for rotating the crankshaft disposed within the turbine housing, a second motor entry port coupled to the one or more second pressurized air tanks for receiving compressed air, and a second motor exit port for exhausting the received compressed air; and
   a clutch for selectively coupling the transmission shaft to the crankshaft.

2. The engine of claim 1, wherein the clutch is configured to couple the transmission shaft to the crankshaft during startup of the engine and in response to a heavy load scenario.

3. The engine of claim 1, wherein each of the one or more first pressurized air tanks is a cylinder made of either carbon fiber or fiber glass and is configured to store compressed air at a pressure of at least 1300 bar.

4. The engine of claim 1, further comprising a first motor entry valve positioned along a channel between the one or more first pressurized air tanks and the first motor entry port, wherein a rotational speed of the transmission shaft is configured to increase in response to opening of the first motor entry valve and to decrease in response to closing of the first motor entry valve.

5. The engine of claim 4, wherein the transmission shaft comprises:
   a secondary casing disposed within the primary casing;
   a plurality of inlets on a surface of the secondary casing and through which the compressed air moves to fill the secondary casing; and
   a plurality of radially-extendable members positioned on the secondary casing and configured to transition between a folded state and an open state, wherein the plurality of radially-extendable members are configured to transition from the folded state to the open state in response to the secondary casing being filled with air.

6. The engine of claim 1, further comprising a suction pump positioned at the first motor exit port, wherein the transmission shaft is configured to increase a rotational speed in response to an increase of force applied by the suction pump.

7. The engine of claim 1, further comprising an airflow control port positioned on the casing and configured to control a direction of airflow through the casing, wherein the direction of airflow through the casing controls a rotational direction of the transmission shaft.

8. The engine of claim 1, wherein each of the one or more second pressurized air tanks is a cylinder made of either carbon fiber or fiber glass and configured to store compressed air at a pressure of at least 1300 bar.

9. The engine of any one of claim 1, further comprising a second motor entry valve positioned along a channel between the one or more second pressurized air tanks and the second motor entry port, wherein the second motor entry valve is configured to open the channel in response to a manual input.

10. The engine of claim 9, wherein the second motor entry valve is a shaft, and wherein the shaft is configured to slide in a direction that opens the channel between the one or more second pressurized air tanks and the second motor entry port in response to the manual input.

11. The engine of claim 9, wherein the manual input is depression of an accelerator pedal in a vehicle.

12. The engine of claim 1, wherein the turbine of the second motor includes at least three and up to ten blades radially extending from the crankshaft.

13. The engine of claim 1, further comprising:
an external turbine connected to the second motor exit port to receive exhaust air at a pressure level higher than ambient pressure;
an alternator coupled to the external turbine and configured to convert mechanical energy of the external turbine into electrical energy;
a compressor powered at least in part by electrical energy generated from the alternator and configured to replenish pressurized air to at least one of the one or more second pressurized air tanks.

14. The engine of claim 13, wherein the compressor is configured to replenish pressurized air to at least one of the one or more second pressurized air tanks by up to 100 bar.

15. The engine of claim 13, wherein the alternator is further configured to supply electrical energy to at least one of a vehicle battery or a vehicle auxiliary device.

16. A vehicle comprising the engine of claim 1.

17. The vehicle of claim 16, further comprising a case installed on a chassis of the vehicle, and wherein the one or more second pressurized air tanks comprises three pressurized air tanks positioned in the case and configured to provide the compressed air to the motor in parallel.

18. The vehicle of claim 17, wherein the one or more second pressurized air tanks comprises a fourth pressurized air tank configured to store compressed air and connected to the three pressurized air tanks in the case.

19. The vehicle of claim 16, further comprising:
a first foot pedal configured to open the first motor entry port; and
a second foot pedal configured to open the second motor entry port.

20. The vehicle of claim 16, wherein the first motor is configured to drive the transmission shaft at 40,000 revolutions per minute (rpm), and wherein the second motor is configured to drive the turbine at 70,000 rpm.

* * * * *